United States Patent [19]
Mannichi et al.

[11] Patent Number: 5,161,036
[45] Date of Patent: Nov. 3, 1992

[54] PICTURE DIGITIZING SYSTEM USING RANDOMLY VARIED BINARY THRESHOLD DATA

[75] Inventors: Toshihiko Mannichi, Fuchu; Toshifumi Yamamoto, Shiroyama, both of Japan

[73] Assignee: Kabushiki Kaisha Toshiba, Kawasaki, Japan

[21] Appl. No.: 626,707

[22] Filed: Dec. 14, 1990

[30] Foreign Application Priority Data

| Dec. 15, 1989 | [JP] | Japan | 1-325548 |
| Dec. 15, 1989 | [JP] | Japan | 1-325549 |
| Jul. 18, 1990 | [JP] | Japan | 2-189752 |
| Oct. 24, 1990 | [JP] | Japan | 2-286272 |

[51] Int. Cl.$^5$ .......................................... H04N 1/40
[52] U.S. Cl. ................................. 358/466; 358/448
[58] Field of Search .......................... 358/465–466, 358/448, 456, 461; 382/50–53

[56] References Cited

U.S. PATENT DOCUMENTS

| 4,593,325 | 6/1986 | Kannapell et al. | 358/466 |
| 4,720,822 | 12/1987 | Matsunawa | 358/466 |
| 4,995,092 | 2/1991 | Kochert et al. | 358/466 |
| 4,998,122 | 3/1991 | Kanno et al. | 358/466 |
| 5,006,938 | 4/1991 | Mita | 358/466 |
| 5,050,000 | 9/1991 | Ng | 358/466 |

FOREIGN PATENT DOCUMENTS 57-104369  6/1982  Japan.

Primary Examiner—Stephen Brinich
Attorney, Agent, or Firm—Finnegan, Henderson, Farabow, Garrett and Dunner

[57] ABSTRACT

A binary digitizing system which is effective when it is desired to reproduce a picture having a half-tone level with use of, for example, a dot printer or the like. Binary threshold data for comparison with a current picture signal is randomly changed slightly within a predetermined range to such an extent that users cannot recognize change in the level of the binary threshold data, thus preventing the continuation of such regular binary pattern. Further, the binary threshold data for comparison with a current input picture signal is changed according to a desired density to obtain a binary picture signal corresponding to the desired density.

20 Claims, 12 Drawing Sheets

PICTURE DIGITIZING SYSTEM USING RANDOMLY VARIED BINARY THRESHOLD DATA

BACKGROUND OF THE INVENTION

1. Field of the Invention

The present invention relates to a picture digitizing system which is effective when it is desired to reproduce a picture having a half-tone level with use of, for example, a dot printer or the like.

2. Description of the Related Art

Such a picture having a half-tone level as a photograph picture has been recently output and displayed with use of such a simple binary recorder as a dot printer. Since this sort of recorder cannot provide multiple display states more than two display states, white and black, it becomes necessary to effectively convert the above half-tone picture into binary one. With regard to the binary processing, for example, for photographs on newspapers, various screens having different net sizes are used to provide a varying density effect to the photograph. However, the employment of this method to the dot printer or the like as it is involves difficulties.

To avoid these difficulties, it has been common practice to typically introduce such an organization dither method or a mean error least method to convert a half-tone picture into binary one. In the organization dither method, a suitable threshold level is previously set for pixel positions and a pixel signal is discriminated and converted into binary one on the basis of the threshold level. However, this organization dither method is inferior to the above mean error least method in picture quality. In the mean error least method, on the other hand, binary processing (conversion to a binary data) is determined so that an average of differences between an original picture and binary pictures each made of a plurality of picture elements (pixels) in small zones of the original picture becomes small. This mean error least method however has a defect that, though the method can provide improved picture quality, the binary processing is comples and thus requires a large-scale system arrangement.

In view of such circumstances, there has been proposed such a picture digitizing system as taught in Japanese Patent Appln. Laid-Open No. 57-104369 wherein an average density approximation method for converting a half-tone picture to a binary picture is used to obtain the binary picture of a picture quality comparable to that obtained by the mean error least method, and also which can be inexpensively realized with a simple hardware arrangement. In this system, the binary conversion is carried out on the basis of an area ratio of black dots occupied in a small zone, i.e., an average density. The average density is calculated with respect to a dot to be converted to a binary dot as well as already-converted binary dots arranged around the former dot, and the decision of whether the dot to be converted is black or white is made by computing an average density of the dot to be converted when it is black and an average density thereof when it is white, checking which is closer to that of the input signal and employing the closer one.

However, the above picture digitizing system has had a problem that, when the system reads or inputs such a picture having a regularly varying density or a constant density as artificially created, a regular read level continues and therefore its output dot pattern becomes similar, which results in that the picture quality is deteriorated.

In addition, the prior art system has been disadvantageous in that, when picture reproduction is carried out through the conversion of density, $\gamma$ characteristics and so on of the picture, the binary conversion and then the picture processing must be performed, thus requiring a large size of hardware.

SUMMARY OF THE INVENTION

It is an object of the present invention to provide a picture digitizing system which can eliminate the above problems in the prior art and can avoid the deterioration of a picture quality even when reading such a picture having a regularly varying density or a constant density as artificially created.

Another object of the present invention is to provide a picture digitizing system which can perform picture processings at a time, thus realizing its small scale hardware.

In accordance with an aspect of the present invention, binary threshold data for comparison with a current picture signal is randomly varied within a predetermined range to slightly change the binary threshold data within such a picture level range that users cannot recognize, whereby the regular binary pattern can be prevented from continuously appearing. As a result, there can be provided a picture digitizing system which, even when the system inputs such a picture having a regularly varying or constant density as artificially created, can avoid the deterioration of the picture quality.

In accordance with another aspect of the present invention, a binary threshold data for comparison with a current input picture signal is changed according to a desired density to obtain a binary picture signal corresponding to the desired density. With such an arrangement, the conversion processings of density, $\gamma$ characteristics and so on of the picture can be carried out at a time during creation of the binary threshold data, whereby its hardware can be reduced in size to a large extent.

DESCRIPTION OF THE PREFERRED EMBODIMENTS

The present invention will be described in connection with embodiments of the invention by referring to the accompanying drawings.

Explanation will first be made as to the principle of how to digitize picture data employed in the present embodiments.

Figures 2A, 2B, 3A, 3B:
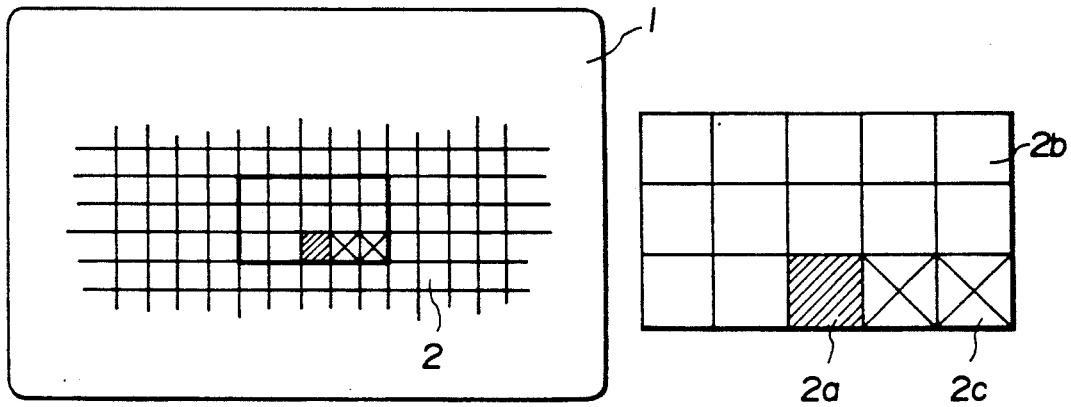
FIGS. 2a-2b show diagrams for explaining the conception of pixel unit and picture processing.
FIGS. 3a-3b are diagrams for explaining an example of a weight factor.

FIGS. 2(a) and 2(b) show diagrams for explaining a relationship between a half-tone picture 1 and a picture element (pixel) 2 extracted and sampled from the picture 1 through raster scanning operation of the picture 1, wherein FIG. 2(a) is a general arrangement and FIG. 2(b) is an enlarged view of a part thereof.

When an input picture is defined as f(i,j) and binary data at the picture position (i,j) is as binary data g(i,j), the following relationships are satisfied.

$$\left. \begin{array}{l} 0 \leq f(i,j) \leq 1 \\ g(i,j) = 1 \end{array} \right\} \quad (1)$$

These relationships mean that the input picture f(i,j) at the picture position (i,j) has a normalized level between 0 and 1 while the binary data g(i,j) takes a value 0 or 1 with respect to the level of the input picture. In FIG. 2(b), a pixel 2a shown by a hatched area corresponds to data at a position to be processed and pixels 2b indicate binary data already subjected to a digitizing processing, and pixels 2c indicate non-processed pixels. The pixels 2b are extracted from two previous pixels of the picture 2a and five pixels of each of two previous lines of the pixel 2a, and the pixels 2c are extracted from two proceeding pixels of the pixel 2a. Assume that Q denotes a set of already processed pixels 2b and Q' denotes a set including the Q and the pixel 2a to be processed. Then the digitizing algorithm of the present system is expressed as follows.

$$g(M,N) = F\{f(M,N), g(i,j)[(i,j) \in Q]\} \quad (2)$$

where, the coordinate (M,N) indicates a position of a pixel to be processed and F is a function. That is, the binary data g(M,N) at the pixel position (M,N) to be processed is determined by a certain weight function F on the basis of input picture signal data f(M,N) at the pixel position (M,N) and binary data g(i,j) already digitized at an adjacent pixel position (i,j). The function F is given, for example, as follows.

$$g(M,N) = F(x) = \begin{cases} 1 \ldots X \geq \frac{1}{2}\alpha\,(0,0) \\ 0 \ldots X < \frac{1}{2}\alpha\,(0,0) \end{cases} \quad (3)$$

where X is expressed as follows.

$$X = \{\Sigma \alpha(M-i, N-j)\} \cdot f(M,N) - \Sigma \alpha(M-i, N-j) \cdot g(i,j)$$
$$\quad (i,j) \in Q' \qquad\qquad\qquad (i,j) \in Q$$

where $\alpha(i,j)$ denotes a weight function having such weights, for example, as shown in FIG. 3. As shown by this algorithm, when the weight function is merely previously set, binary data for the above picture signal data can be created easily on the basis of the previous (past) binary data and the input picture signal data at the current coordinate position. In addition, since the past data necessary for the digitizing processing are all binary data, the storage of such past data can be facilitated.

As will be clear from the equation (3), in the aforementioned system, the binary data g(M,N) is obtained by finding the value of X in accordance with the above equation and comparing the found X with the factor $\alpha$ (0,0). In other words, it is judged whether or not the following relationship is satisfied.

$$\{\Sigma \alpha(M-i, N-j)\} \cdot f(M,N) - \quad (4)$$
$$(i,j) \in Q'$$

$$\Sigma \alpha(M-i, N-j) \cdot g(i,j) \leq \frac{1}{2}\alpha\,(0,0)$$
$$(i,j) \in Q$$

When attention is paid to the expression (4), the following relationship (5) can be obtained.

$$f(M,N) - \frac{\Sigma \alpha(M-i, N-j) \cdot g(i,j)}{\Sigma \alpha(M-i, N-j)} \leq \frac{\frac{1}{2}\alpha\,(0,0)}{\Sigma \alpha(M-i, N-j)} \quad (5)$$
$$\qquad\qquad (i,j) \in Q \qquad\qquad\qquad (i,j) \in Q'$$
$$\qquad\qquad (i,j) \in Q'$$

Hence, when it is judged whether the following relation (6) is satisfied, the binary data g(M,N) can be directly obtained.

$$f(M,N) \leq \frac{\Sigma \alpha(M-i, N-j) \cdot g(i,j) + \frac{1}{2}\alpha\,(0,0)}{\Sigma \alpha(M-i, N-j)} \quad (6)$$
$$\qquad\qquad (i,j) \in Q \qquad\qquad\qquad$$
$$\qquad\qquad (i,j) \in Q'$$

Thus, the right side of the above expression is expressed as the past data g(i,j).

According to this system, however, in the event where read half-tone level has a regularity or a uniform constant density is continued, the value of the left side of the above expression can be very close to the value of the right side thereof. Thus, the similar pattern appears repetitively and becomes noticeable, which leads to deterioration in the picture quality.

In order to avoid this, in accordance with the present invention, a very low density level δ is added to the right side of the expression (6), as shown by the following expression (7).

$$f(M, N) \leq \frac{\sum_{(i,j)\in Q} a(M-i, N-j) \cdot g(i,j) + \frac{1}{2}a(0,0)}{\sum_{(i,j)\in Q'} a(M-i, N-j)} + \delta \quad (7)$$

where $$\delta \geq \frac{a(M-i, N-j)}{\sum_{(i,j)\in Q'} a(M-i, N-j)} \quad (8)$$

In the expression (8), $a$ $(M-i, N-j)$ is a condition for its possible minimum value. With such an arrangement, it can be prevented that such a relationship as mentioned above collapses and the similar pattern repetitively appears, thus preventing the deterioration of the picture quality.

Figure 1:
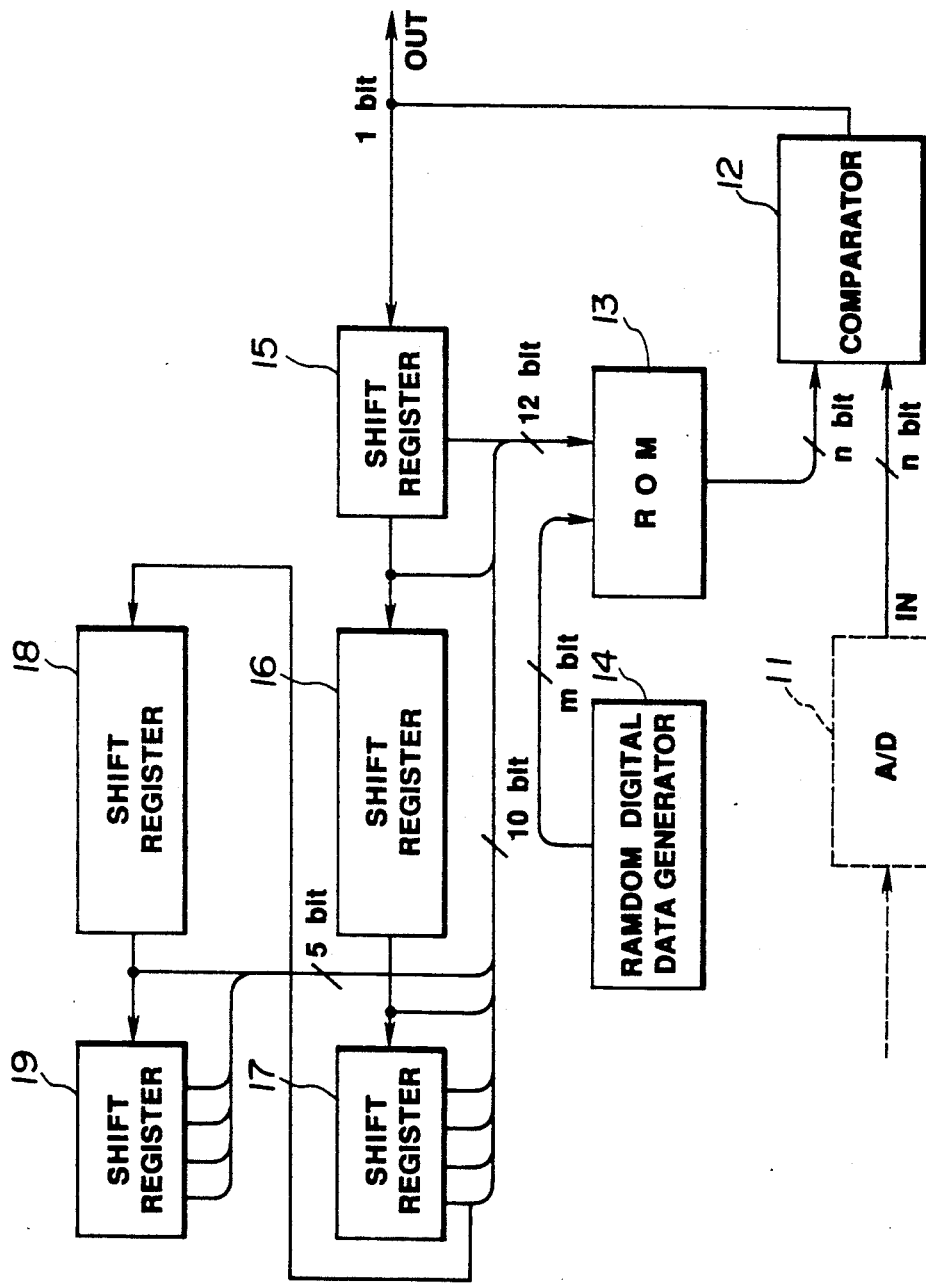
FIG. 1 is a block diagram of a picture digitizing system in accordance with an embodiment of the present invention.

Referring now to FIG. 1, there is shown a block diagram of a picture digitizing system in accordance with an embodiment of the present invention which realizes the aforementioned algorithm. An input picture signal obtained through the line scanning operation of a half-tone picture is converted into digital data of n bits through, for example, an A/D converter 11. The digital data is sent from the A/D converter to a comparator 12 to be compared with binary threshold data of n bits received at the comparator from a read-only memory 13 (ROM) to be described later. The comparator 12, on the basis of the comparison result, outputs binary digital data corresponding to the input picture signal. Between the A/D converter 11 and the comparator 12, needless to say, such a picture correction circuit as, for example, a shading correction circuit or an automatic gain correction circuit may be provided as necessary. The ROM 13 receives binary digital data of 12 bits to be explained later and random digital data of m bits as address data from a random digital data generator 14, and outputs the aforementioned binary threshold data of n bits created in accordance with the foregoing algorithm.

The binary data of one bit issued from the comparator 12 is supplied to a predetermined output apparatus (not shown) and also through a shift register 15 (where the input data is delayed by twice its sampling time) sequentially to shift registers 16, 17, 18 and 19. The shift registers 16 and 17, which are connected in series with each other, act to delay the one-bit digital data by one line scanning time period, and the latter-stage shift register 17 outputs from its taps one-bit binary data at adjacent, say, 5 sample (5 pixel) positions on a parallel basis. Similarly, the shift registers 18 and 19, which are connected in series with each other, act to delay their input signal by one line scanning time period, and the latter-stage shift register 19 outputs from its taps one-bit binary data at the 5 sample positions. A total of 12 bits of such parallel data parallelly extracted from these shift registers 15, 17 and 19 are used as the aforementioned address data of the ROM 13.

More in detail, when an output of the A/D converter at a time $t_0$ is picture signal data of n bits ($C_0, C_1, C_2, \ldots,$ and $C_{n-1}$), the shift register 15 outputs, at the time $t_0$, one-sample previous binary data $D_{-1}$ and two-sample previous binary data $D_{-2}$. Further, when the number of samples to be processed through one line scanning operation is L, the parallel outputs of the shift register 17 correspond to binary data $D_{-(L-2)}, D_{-(L-1)}, D_{-L}, D_{-(L+1)}, D_{-(L+2)}$, whereas the parallel outputs of the shift register 19 correspond to binary data $D_{-(2L-2)}, D_{-(2L-1)}, D_{-2L}, D_{-(2L+1)}, D_{-(2L+2)}$. Therefore, the ROM 13 receives 12 bit data of $D_{-1}, D_{-2}, D_{-(L-2)}$ to $D_{-(L+2)}$, and $D_{-(2L-2)}$ to $D_{-(2L+2)}$ as well as random digital data of m bits from the random digital data generator 14, i.e., a total of (12+m) bits of data.

The data $C_0$ to $C_{n-1}$ correspond to f(M,N) in the aforementioned algorithm, while the 12-bit data $D_{-1}, D_{-2}, D_{-(L-2)}$ to $D_{-(L+2)}$, and $D_{-(2L-2)}$ to $D_{-(2L+2)}$ correspond to $g(i,j)[i,j\in Q]$.

Binary threshold data of n bits previously registered in the ROM 13 is calculated and created in accordance with the aforementioned algorithm, and the random digital data of m bits issued from the random digital data generator 14 is used to randomly select the previously-created binary threshold data of the ROM 13 having slightly different density levels. The m-bit random digital data varies from pixel to pixel and how to generate this data and the size of the m are arbitrary.

Although the shift registers have been used to provide the line delay to the binary data in the foregoing embodiment, the binary data may be stored in a random access memory (RAM) to be controlled by an address controller. Further, the comparator 12 performs its comparison operation with respect to the n-bit digital data, but the comparator 12 may be replaced by an analog comparator to directly input the input picture data without the intervention of the A/D converter 11, whereby the n-bit digital data from the ROM 13 is converted into an analog data through a D/A converter for the comparison at the analog comparator.

Figure 4:
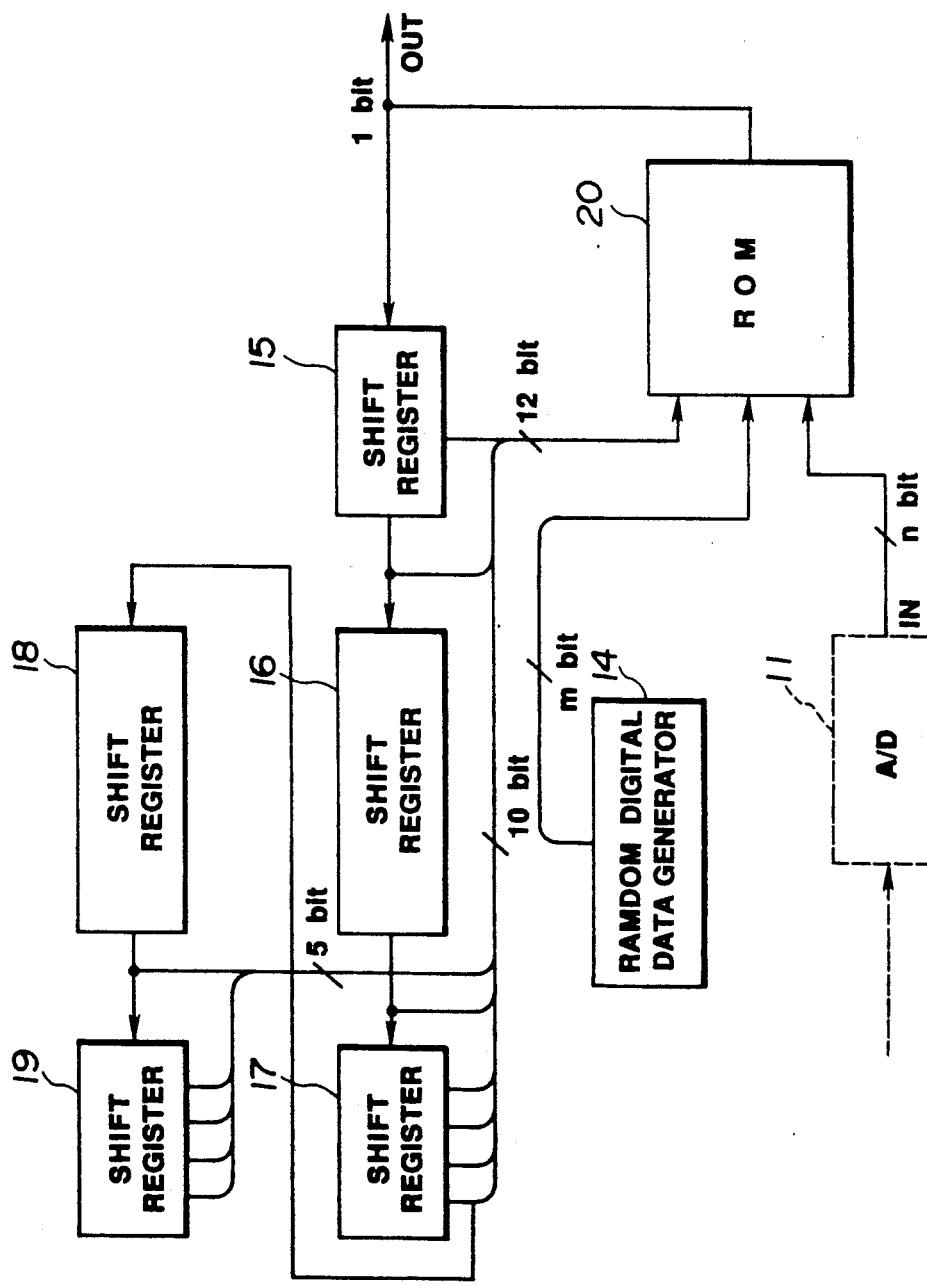
FIG. 4 is a block diagram of another embodiment of the invention wherein a ROM and a comparator in the embodiment of FIG. 1 are replaced by a ROM.

Shown in FIG. 4 is another embodiment of the present invention, in which the ROM 13 and the comparator 12 in FIG. 1 is replaced by a ROM 20. In the present embodiment, the ROM 20 receives a total of (12+m+n) bits of data, that is, a total of 12 bits of parallel data parallelly issued from the shift registers 15, 17 and 19, the random digital data of m bits from the random digital data generator 14, and the data of n bits from the A/D converter 11; and outputs a desired binary picture signal. Other arrangement is substantially the same as that shown in FIG. 1.

In the foregoing embodiment, such past binary data as a pixel zone Q and a pixel number fed back in the binary processing as well as the weight function $a$ and the very low density level $\delta$ can be determined according to the application specifications and the present invention is not limited only to the foregoing arrangement. Further, although the very low density level $\delta$ has been randomly added, the level $\delta$ may be added randomly only when the level is continuously constant or according to a predetermined method, or the level $\delta$ may not be added but multiplied by a predetermined value. In addition, the very low density level $\delta$ has been added to the binary threshold data. but it may be added to the input picture signal, as a matter of course.

Through computation data have been previously registered in the ROM 13 in the embodiment of FIG. 1, the embodiment may be arranged so that the ROM is not used and computation is carried out each time.

Figure 5:
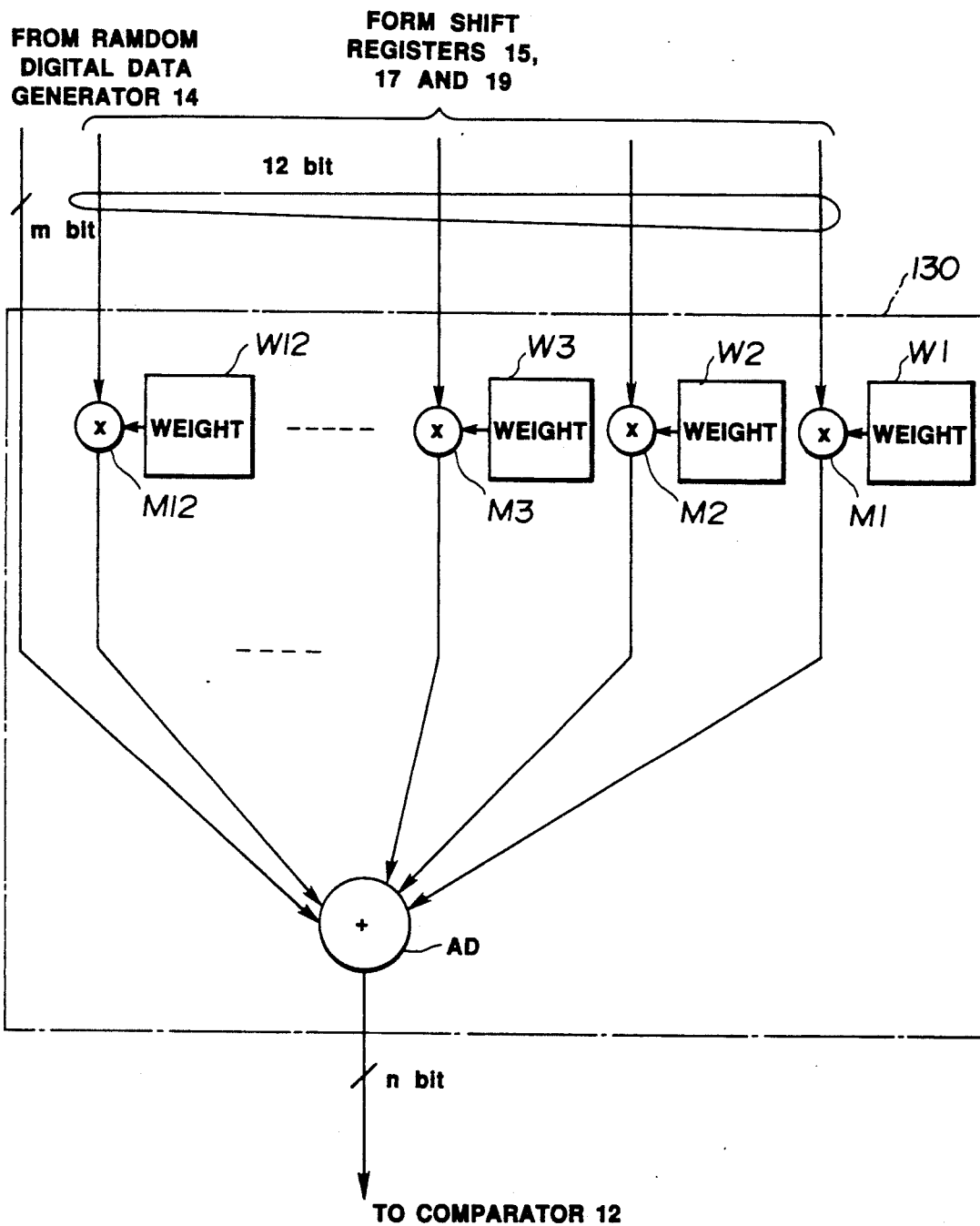
FIG. 5 is a block diagram of an example of the ROM in FIG. 1 constituted as a computation circuit.

The latter case is shown in FIG. 5 as a further embodiment of the present invention. In the drawing, a computation circuit 130 receives 12 bits of signals from the shift registers 15, 17 and 19 as well as an m bits of signal from the random digital generator 14. The computation circuit 130 includes 12 multipliers M1 to M12, 12 weight factor setting circuits W1 to W12 and a single adder AD, and performs the operation corresponding to the right side of the equation (6). The present embodiment is arranged so that the random digital generator 14 of FIG. 1 generates such a signal that the value ½α (0.0) is taken into consideration and the A/D converter 11 of FIG. 1 outputs a signal including the value of a denominator of the right side of the equation (6).

In this way, in accordance with the embodiments of FIGS. 1 to 5, there can be provided such picture digitizing systems of relatively simple arrangements that, even when reading such a picture having a regularly varying density or having a constant density as created artificially, can prevent the deterioration of the picture quality.

In an average-density approximation method shown in the equation (6), when it is desired to reproduce the picture through the conversion of the density, γ characteristics and so on of the picture, the density conversion is previously carried out in the previous-stage and then the picture processing is carried out. That is, when the input picture f(M,N) is subjected to a density level conversion, an algorithm shown in the following expression (9) is carried out.

$$f(M, N) \cdot h(M, N) \lessgtr \frac{\sum_{(i,j) \in Q} \alpha(M - i, N - j) \cdot g(i, j) + \frac{1}{2}\alpha(0, 0)}{\sum_{(i,j) \in Q'} \alpha(M - i, N - j)} \quad (9)$$

From the above equation, the following expression is obtained.

$$f(M, N) \lessgtr \frac{\sum_{(i,j) \in Q} \alpha(M - i, N - j) \cdot g(i, j) + \frac{1}{2}\alpha(0, 0)}{\sum_{(i,j) \in Q'} \alpha(M - i, N - j)} \cdot \frac{1}{h(M, N)} \quad (10)$$

Thus, it will be seen that a picture to be reproduced can be reproduced by converting the density, γ characteristics and so on of the reproduction picture during creation of binary threshold data.

Figure 6:
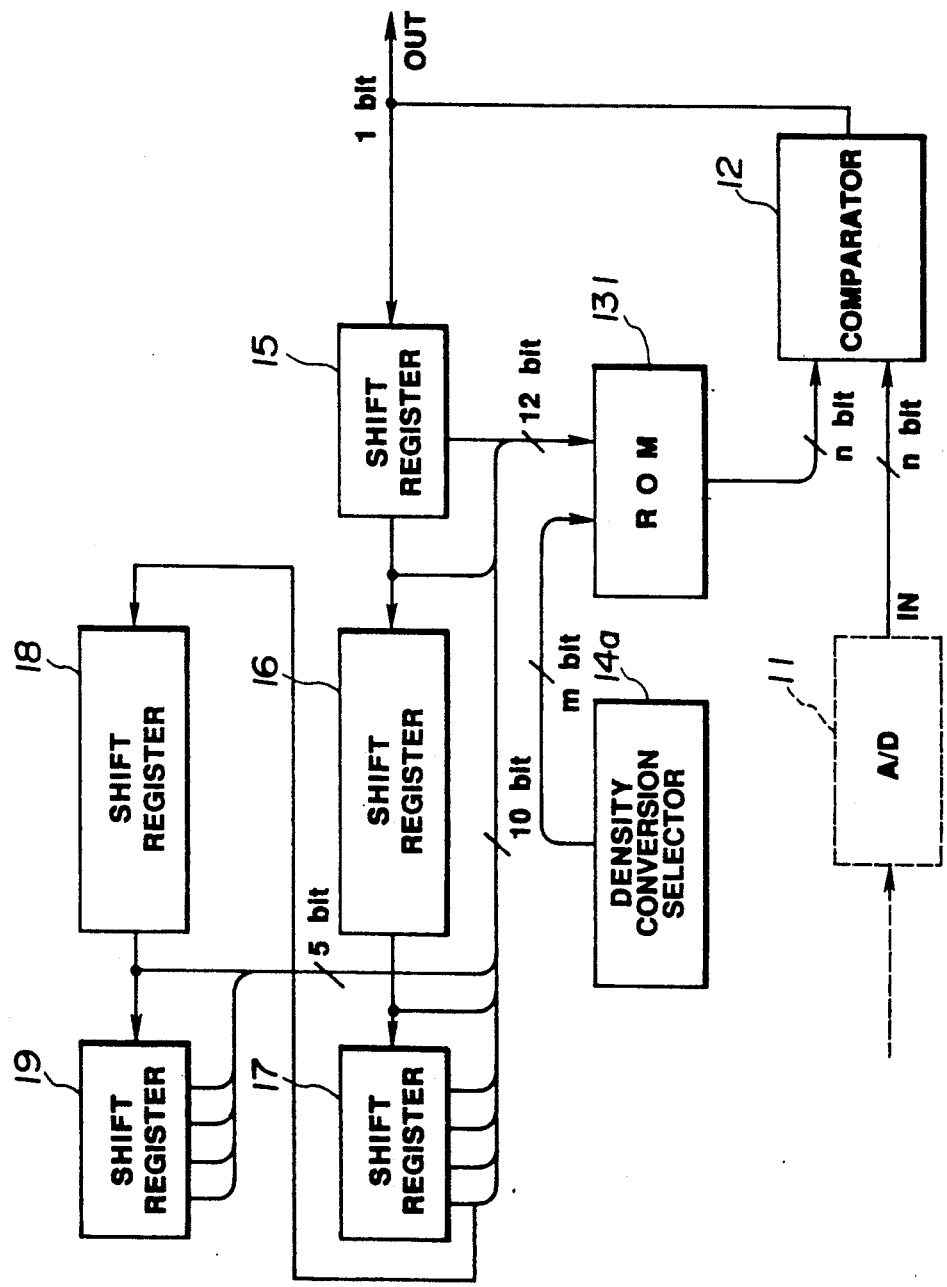
FIG. 6 is a block diagram of a further embodiment of the invention wherein conversion processings of density, $\gamma$ characteristics and so on of a picture are carried out at a time during creation of binary threshold data.

FIG. 6 shows a block diagram of a picture digitizing system in accordance with a further embodiment of the present invention realizing the aforementioned algorithm. In the arrangement of the system of FIG. 6, the random digital data generator 14 in FIG. 1 is replaced by a density conversion selector 14a which outputs density threshold selection data of m bits to a ROM 131 as its address data. Other arrangement is substantially the same as that of FIG. 1.

In accordance with the present embodiment, there can be provided a picture digitizing system which can be realized inexpensively with a relatively simple arrangement and can perform conversion over the density, γ characteristics and so on of a picture at a time during generation of binary threshold data, thus enabling the remarkable reduction of size of its hardward.

Although the shift registers have been used to provide the line delay to the binary data in the embodiment of FIG. 6, the line delay of the binary data may be achieved by storing the binary data in a random access memory (RAM) to be controlled by an address controller. Further, the comparator 12 performs its comparison operation with respect to the n-bit digital data, but the comparator 12 may be replaced by an analog comparator to directly input the input picture data without the intervention of the A/D converter 11, whereby the n-bit digital data from the ROM 131 is converted into an analog data through a D/A converter for the comparison at the analog comparator.

The foregoing embodiment can have substantially the same effect as that of FIGS. 1, 4 and 5 when the binary threshold data is varied within a predetermined range with the arrangements of FIGS. 1, 4 and 5.

Figure 7:
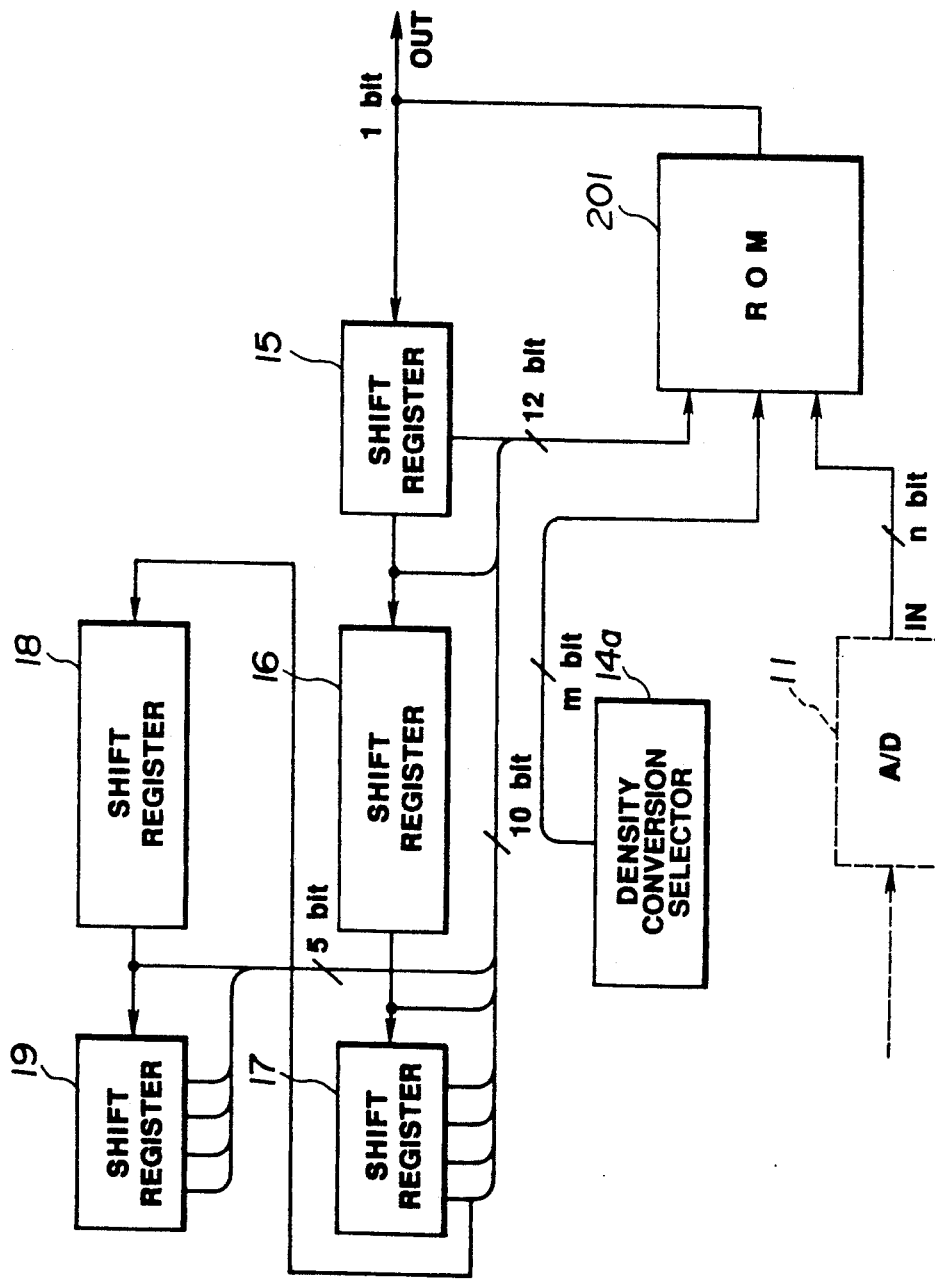
FIG. 7 is a block diagram of yet another embodiment of the invention wherein a ROM and a comparator in the embodiment of FIG. 6 are replaced by a ROM.

Referring to FIG. 7, there is shown yet another embodiment of the present invention, wherein the ROM 131 and the comparator 12 in FIG. 6 are replaced by a ROM 201. In the present embodiment, the ROM 201 receives a total of (12+m+n) bits of data, that is, a total of 12 bits of parallel data parallelly issued from the shift registers 15, 17 and 19, the density threshold selection data of m bits from the density threshold selector 14a, and the data of n bits from the A/D converter 11; and outputs a desired binary picture signal. Other arrangement is substantially the same as that shown in FIG. 6.

In the foregoing embodiment, such past binary data as a pixel zone Q and a pixel number fed back in the binary processing as well as the weight function α and the density conversion function h(M,N) can be determined according to the application specifications. Further, in place of the ROM having the computation data previously registered therein, such a computation circuit as shown in FIG. 5 may be used to perform the computation each time.

In the foregoing embodiment, when it is desired to realize the system shown by the equation (6), address bits corresponding in number to the past binary data g(i,j) are necessary, because the computation of the right side of the equation (6) is carried out by previously registering the computation data in the ROM and making access to the data with use of the past data g(i,j).

A term which follows in the equation (6):

$$\sum \alpha(M-i, N-j) \cdot g(i,j) \quad (i,j) \in Q$$

corresponds to a sum of multiplication results of the pixel g(i,j) (black pixel 1, white pixel 0) is multiplied by such a weight factor α (M−i,N−j) as shown in FIG. 3. However, for example, such a sum may be obtained by combining terms corresponding to pixels having the same weight factor α (M−i,N−j) and multiplying the number of black pixels g(i,j) by the weight factor α (M−i,N−j).

Figure 8:
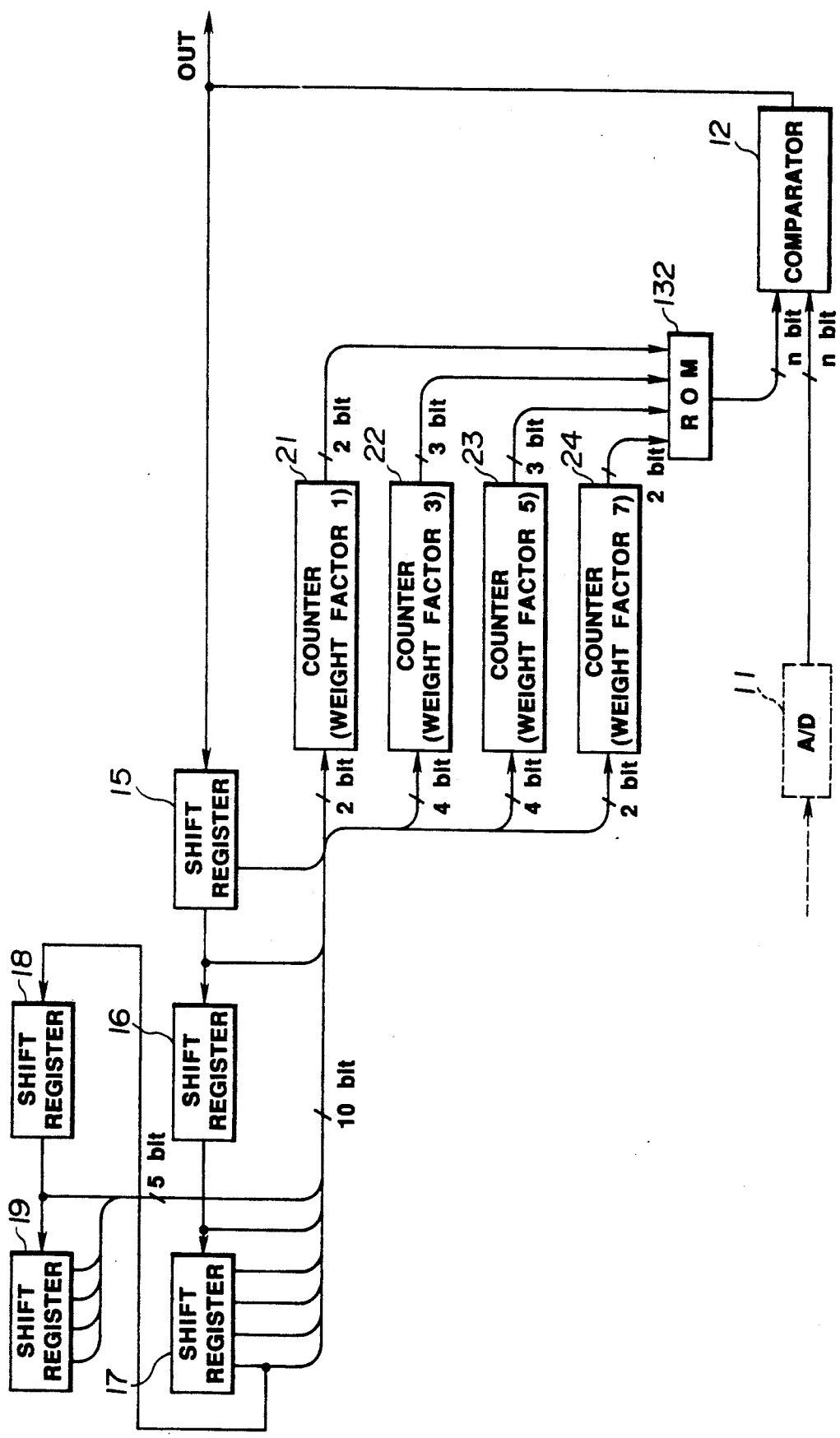
FIG. 8 is a block diagram of yet a further embodiment of the invention wherein the storage capacity of a ROM can be made small.

FIG. 8 schematically shows an arrangement of the latter case as yet a further embodiment of the present invention, in which an input picture signal obtained through the line scanning operation of a half-tone picture is converted into digital data of n bits through, for example, an A/D converter 11. The digital data is sent from the A/D converter to a comparator 12 to be compared with binary threshold data of n bits received at the comparator from a read-only memory 132 (ROM) to be described later. The comparator 12, on the basis of the comparison result, outputs binary digital data corresponding to the input picture signal. Between the A/D converter 11 and the comparator 12, needless to say, such a picture correction circuit as, for example, a shading correction circuit or an automatic gain correction circuit may be provided as necessary.

The ROM 132 receives binary digital data of 10 bits to be explained later as address data, and outputs the aforementioned binary threshold data of n bits created in accordance with the foregoing algorithm.

The binary data of one bit issued from the comparator 12 is supplied to a predetermined output apparatus (not shown) and also through a shift register 15 (where the input data is delayed by twice its sampling time) sequentially to shift registers 16, 17, 18 and 19. The shift registers 16 and 17, which are connected in series with each other, act to delay the one-bit digital data by one line scanning time period, and the latter-stage shift register 17 outputs from its taps one-bit binary data at adjacent, say, 5 sample (5 pixel) positions on a parallel basis. Similarly, the shift registers 18 and 19, which are connected in series with each other, act to delay their input signal by one line scanning time period, and the latter-stage shift register 19 outputs from its taps one-bit binary data at the 5 sample positions.

In FIG. 8, the shift registers 15, 16, 17, 18 and 19 as well as the A/D converter 11 have the same functions as those having the same reference numerals in FIG. 1.

In the present embodiment, the total of 12 bits of data parallelly taken from the shift registers 15, 17 and 19 are combinedly input to counters 21, 22, 23 and 24 which count the numbers of black pixels and apply the counted results to the ROM 132 as its address data.

More in detail, when an output of the A/D converter at a time $t_o$ is picture signal data of n bits ($C_0, C_1, C_2, \ldots, C_{n-1}$), the shift register 15 outputs, at the time $t_0$, one-sample previous binary data $D_{-1}$ and two-sample previous binary data $D_{-2}$. Further, when the number of samples to be processed through one line scanning operation is L, the parallel outputs of the shift register 17 correspond to binary data $D_{-(L-2)}$, $D_{-(L-1)}$, $D_{-L}$, $D_{-(L+1)}$, $D_{-(L+2)}$, whereas the parallel outputs of the shift register 19 correspond to binary data $D_{-(2L-2)}$, $D_{-(2L-1)}$, $D_{-2L}$, $D_{-(2L+1)}$, $D_{-(2L+2)}$.

Thus, in the case where such a weight factor matrix as shown in FIG. 3 is employed for example, the counter 21 receives the binary data $D_{-(2L-2)}$ and $D_{-(2L+2)}$ of two bits corresponding to weight factor 1 and outputs the then counted result of 2 bits for black pixels to the ROM 132; the counter 22 receives the binary data $D_{-(2L-1)}$, $D_{-(2L+1)}$ $D_{-(L-2)}$ and $D_{-(L+2)}$ of four bits corresponding to weight factor 3 and outputs the then counted result of 3 bits for black pixels to the ROM 132; the counter 23 receives the binary data $D_{-2L}$, $D_{-(L-1)}$ $D_{-(L+1)}$ and $D_{-2}$ of four bits corresponding to weight factor 5 and outputs the then counted result of 3 bits for black pixels to the ROM 132; and the counter 24 receives the binary data $D_{-L}$ and $D_{-1}$ of two bits corresponding to weight factor 7 and outputs the then counted result of 2 bits for black pixels to the ROM 132.

The data $C_o$ to $C_{n-1}$ correspond to f(M,N) in the aforementioned algorithm, while the 12-bit data $D_{-1}$, $D_{-2}$, $D_{-(L-2)}$ to $D_{-(L+2)}$, and $D_{-(2L-2)}$ to $D_{-(2L+2)}$ correspond to g(i,j)[i,j∈Q].

Binary threshold data of n bits previously registered in the ROM 132 is calculated and created in accordance with the aforementioned algorithm. Although the shift registers have been used to provide the line delay to the binary data in the foregoing embodiment, the binary data may be stored in a random access memory (RAM) to be controlled by an address controller.

Figure 9:
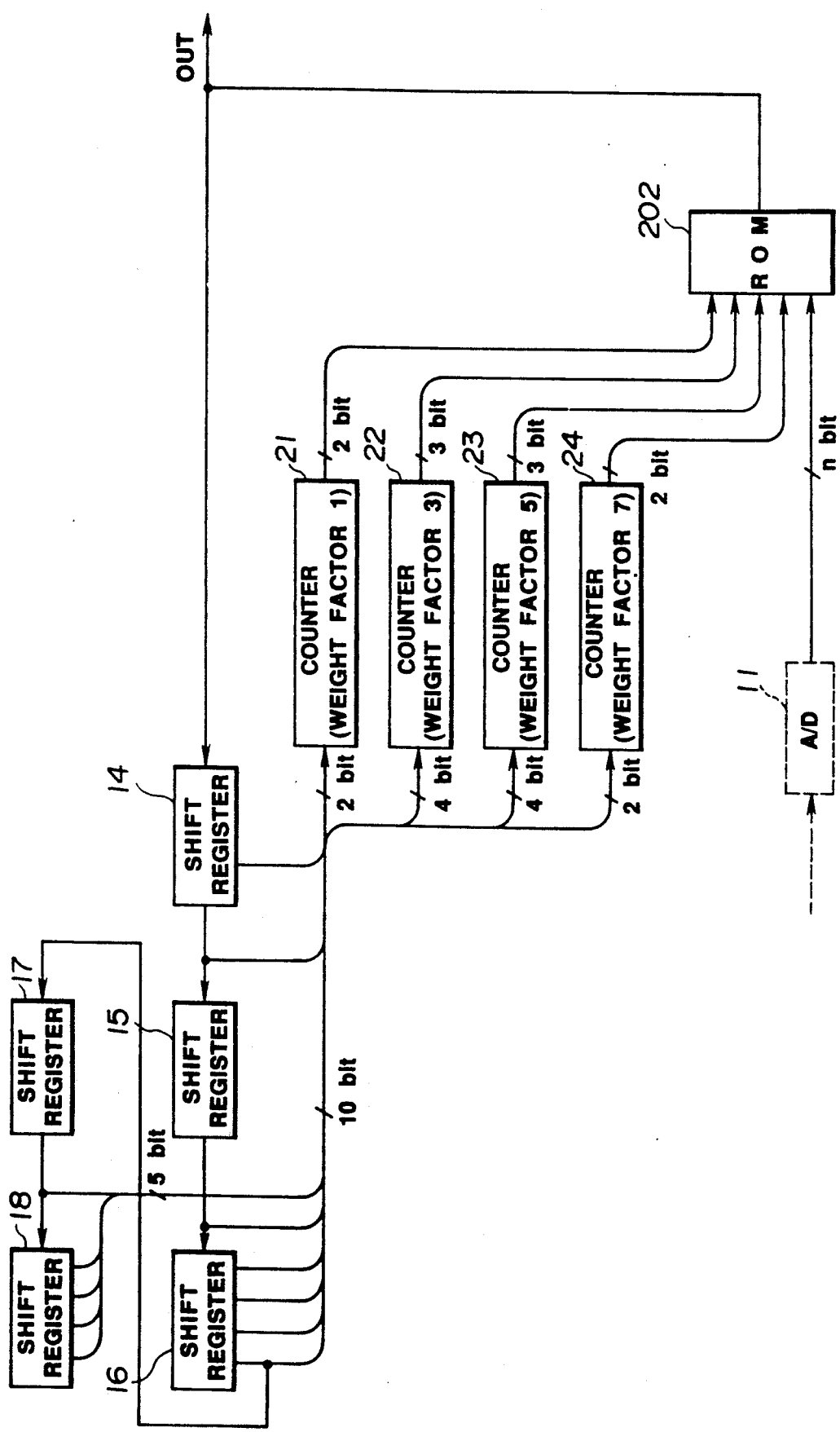
FIG. 9 is a block diagram of other embodiment of the invention wherein a ROM and a comparator in the embodiment of FIG. 8 are replaced by a ROM.

Shown in FIG. 9 is other embodiment of the present invention, in which the ROM 132 and the comparator 12 in FIG. 8 are replaced by a ROM 202. In the present embodiment, the ROM 202 receives a total of (10+n) bits of data, that is, the measured data of 10 bits from the counters 21, 22, 23 and 24 as well as data of n bits from the A/D converter 11; and outputs a desired binary picture signal. Other arrangement is substantially the same as that of FIG. 8.

In the embodiments of FIGS. 8 and 9, the average density is obtained not by inputting the already-digitized binary dot data in the ROM at its address as it is but by counting or computing the numbers of black pixels in the binary dot data having the same weight factors and inputting the counted results in the ROM, so that, even when the pixel zone Q is expanded, it is unnecessary to expand the zone of the memory ROM and the zone can be used without any change. In this way, the embodiments of FIGS. 8 and 9 are highly effective. In other words, the necessary capacity of the memory ROM can be made small. This is very important in that, when it is desired to make the system in the form of a gate array, the counters can be built in the gate array but the ROM cannot be incorporated therein and must be provided as an external device of the gate array.

In the embodiments of FIGS. 8 and 9, the binary threshold data may be varied as shown in FIGS. 1, 4, 5, 6 and 7.

In each of the foregoing embodiments, in making the hardware part of the system in the form of a gate array, it sometimes becomes difficult to make the ROM part for computation of the average density in the form of the gate array because of its large amount of data. To avoid such a difficulty, the computation of the average density effected in the ROM part is arranged to be carried out by a hardware comprising simple adders and flip-flops, whereby the formation of the gate array can be readily achieved and a high-speed processing can be realized. This is shown in FIG. 10 as other embodiment of the present invention.

In the present embodiment, the adders and the flip-flops are used to perform sequential addition of weighted binary data to thereby create binary threshold data for the current input picture signal. As a result, any ROM part can be eliminated, the formation of the system in the form of a gate array can be facilitated and the high-speed processing can be realized.

Figure 10:
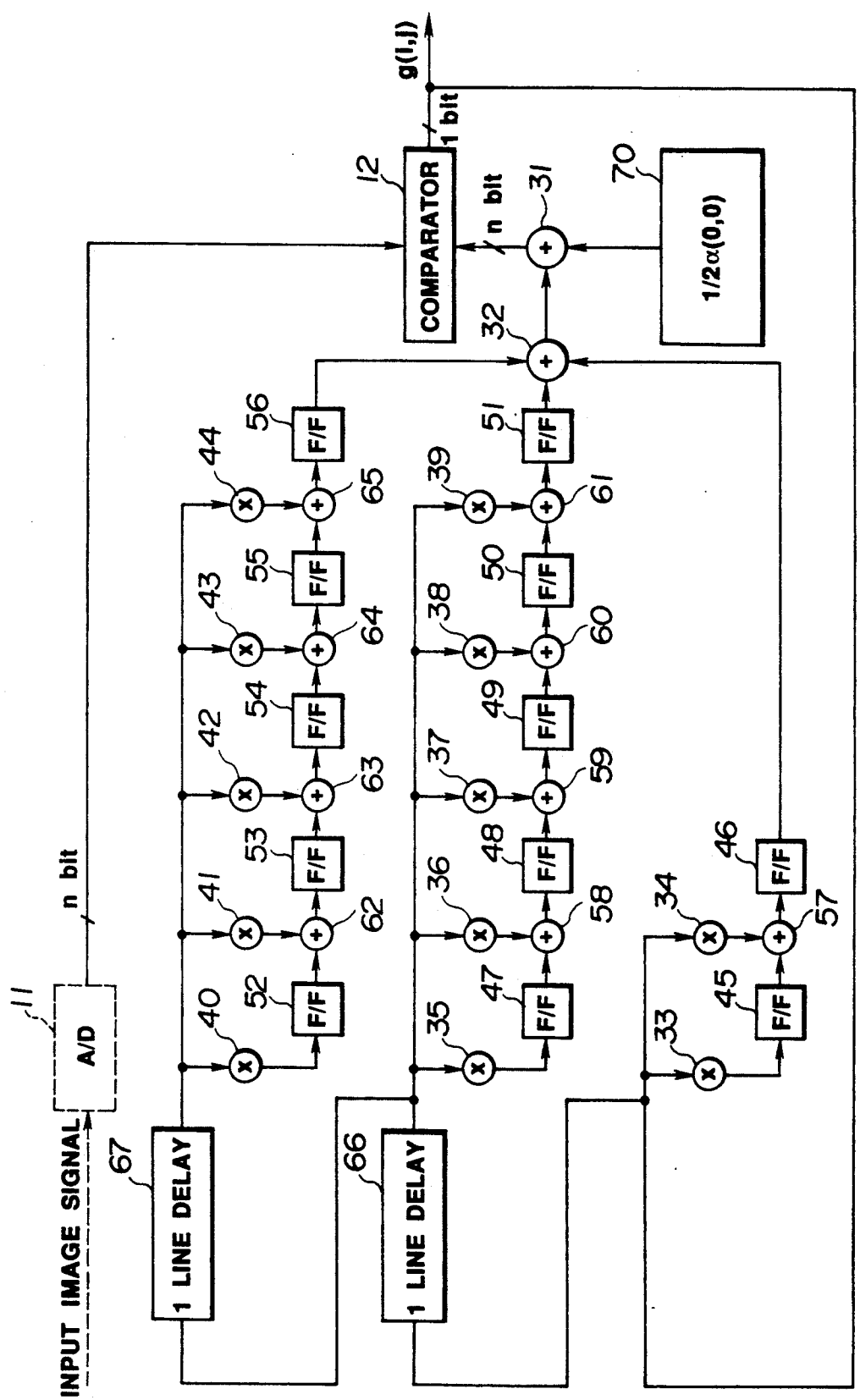
FIG. 10 is a block diagram of other embodiment of the invention which can be suitably made in the form of a gate array.

The above arrangement of the foregoing embodiment of the present invention is schematically shown in FIG. 10. An input picture signal obtained through the line scanning operation of a half-tone picture is converted into digital data of n bits through, for example, an A/D converter 11. The digital data of n bits is sent from the A/D converter to a comparator 12 to be compared with binary threshold data of n bits received at the comparator from an adder 31 to be described later. The comparator 12, on the basis of the comparison result, outputs binary digital data corresponding to the input picture signal. Between the A/D converter 11 and the comparator 12, needless to say, such a picture correction circuit as, for example, a shading correction circuit or an automatic gain correction circuit may be provided as necessary.

The binary one-bit data issued from the comparator 12 is supplied to a predetermined output device (not shown) and also to weighters 33 and 34 and a one-line delay unit 66. The one-line delay unit 66, which functions to delay the binary pixel result by a time corresponding to one line, comprises a random access memory (RAM) which is controlled by an address controller (not shown). An output of the one-line delay unit 66 is supplied to weighters 35, 36, 37, 38 and 39 and also to a one-line delay unit 67. The one-line delay unit 67, which functions to delay the binary result by an additional time corresponding to one line, whereby the binary result is delayed by a time corresponding to a total of two lines. An output of the one-line delay unit 67 is supplied to weighters 40, 41, 42, 43 and 44.

In the weighters 33 and 34, the weight factor $\alpha$ (M−i,N−j) in a term in the right side of the equation (6) is superimposed on the binary result g(i,j). That is, $\alpha$ (M−i,N−j)·g(i,j) is computed.

Figure 11:
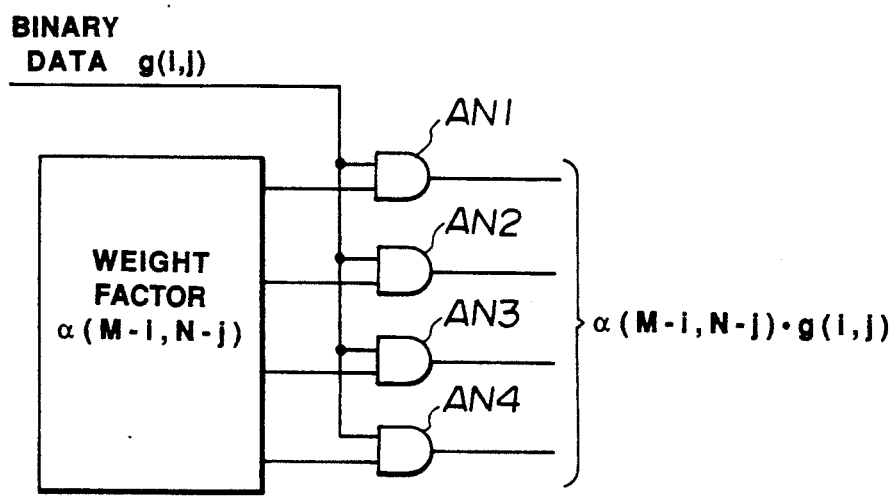
FIG. 11 is a block diagram of an exemplary arrangement of a weighter in FIG. 10.

Shown in FIG. 11 is an example of the arrangement of the weighters 33 to 44. This example shows a weight factor $\alpha$ (M−i,N−j) comprising 4 bits. Since the binary data g(i,j) already digitized is of one bit, $\alpha$(M−i,N−j)·g(i,j) is computed by performing a logical "AND" operation of the respective bits. Thus, the example may comprise only four AND gates AN1 to AN4.

Turning again to FIG. 10, flip-flops 45 to 56 are used to shift the computation result sequentially one pixel after another and the shifted result is sequentially added at adders 57 to 65.

The weighters 33 to 44 have weight factors of $\alpha$ (2,0), $\alpha$ (1,0), $\alpha$ (2,1), $\alpha$ (1,1), $\alpha$ (0,1), $\alpha$ (−1,1), $\alpha$ (−2,1), $\alpha$ (2,2), $\alpha$ (1,2), $\alpha$ (0,2), $\alpha$ (−1,2), and a1 (−2, 2) associated with FIG. 3(b), respectively. More specifically, when such a weight factor matrix as shown in FIG. 3 is employed, the order of the weight factors is 5, 7, 3, 5, 7, 5, 1, 3, 5, 3 and 1.

For example, the output of the flip-flop 45 becomes $\alpha$ (2,0)·g(M−2,N), while the output of the flip-flop 46 becomes $\alpha$ (2,0)·g(M−2,N)+$\alpha$ (1,0)·g(M−1,N). And the output of the flip-flop 51 becomes $\alpha$ (2,1)·g(M−2,N−1)+$\alpha$ (1,1)·g(M−1,N−1)+$\alpha$ (0,1)·g(M,N−1)+$\alpha$ (−1,1)·g(M+1,N−1)+$\alpha$ (−2,1)·g(M+2,N−1); whereas the output of the flip-flop 56 becomes $\alpha$ (2,2)·g(M−2,N−2)+$\alpha$ (1,2)·g(M−1,N−2)+$\alpha$ (0,1)·g(M,N−2)+$\alpha$ (−1,2)·g(M+1,N−2)+$\alpha$ −2,2)·g(M+2,N−2).

Eventually, these results are added together at an adder 32 to obtain the following part in the right side of the equation (6).

$$\Sigma\alpha(M-i,N-j)\cdot g(i,j) \quad (i,j)\epsilon Q$$

The result is input to the adder 31 to be added to $\frac{1}{2}\alpha$ (0,0) in the right side of the equation (6). An addition output of the adder 31 is input to the comparator 12. Transposing the numerator of the right side of the equation (6) to its left side results in:

$$\Sigma\alpha(M-i, N-j)\cdot f(M, N) \leq \quad (11)$$
$$(i,j)\epsilon Q'$$

$$\Sigma\alpha(M-i, N-j)\cdot g(i,j) + \tfrac{1}{2}\alpha(0,0)$$
$$(i,j)\epsilon Q$$

The right side of the equation (11) corresponds to the output of the adder 13. The input picture f(M,N) is a picture at the picture position (M,N) and has a normalized level between 0 and 1.

$$\Sigma\alpha(M-i,N-j)\ (i,j)Q'$$

This means a sum of weight factors. When the weight factor sum is set to be the maximum number of tones in picture data, the left side of the equation (11) corresponds to the level itself of the input picture and thus the input picture level can be compared at the comparator 12 directly with the threshold level received from the adder 31 as already explained above.

Figure 12:
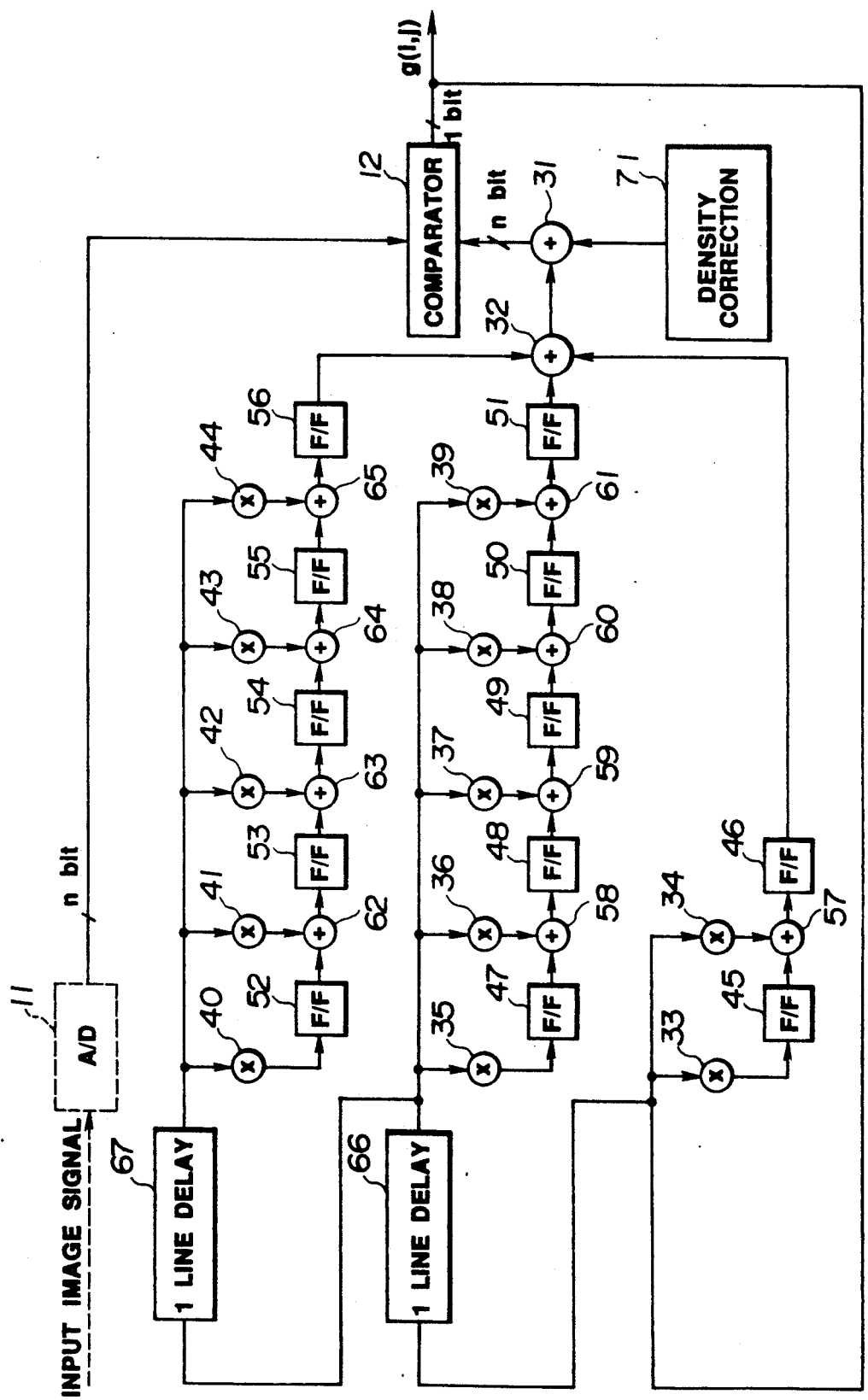
FIG. 12 is a block diagram of other embodiment of the invention wherein the arrangement of FIG. 10 is employed in the arrangement of FIG. 6.

FIG. 12 shows other embodiment of the present invention, wherein a register 70 for storing therein a part, i.e., $\tfrac{1}{2}\alpha$ (0,0), in the right side of the equation (6) in FIG. 10 is replaced by a register 71 for storing therein a density correction value. In the present embodiment, the same density correction method as employed in FIG. 6 is employed. Since the present embodiment is arranged to add the density correction value to the binary threshold value, a picture can be reproduced through the conversion of the density, $\gamma$ characteristics and so on thereof.

For example, adding a correction value h(M,N) to the right side of the equation (11) results in:

$$\Sigma\alpha(M-i, N-j)\cdot f(M, N) \leq \quad (12)$$
$$(i,j)\epsilon Q'$$

$$\Sigma\alpha(M-i, N-j)\cdot g(i,j) + \tfrac{1}{2}\alpha(0,0) + h(M,N)$$
$$(i,j)\epsilon Q$$

It will be appreciated that, when the correction value h(M,N) is transposed to its left side, the left side indicates the value of intensity of the input picture and thus the density is converted. Further, the correction value h(M,N) should be preferably a correction value when the coefficient $\tfrac{1}{2}\alpha$ (0,0) is taken into consideration. Other arrangement is substantially the same as that of FIG. 10.

Figure 13:
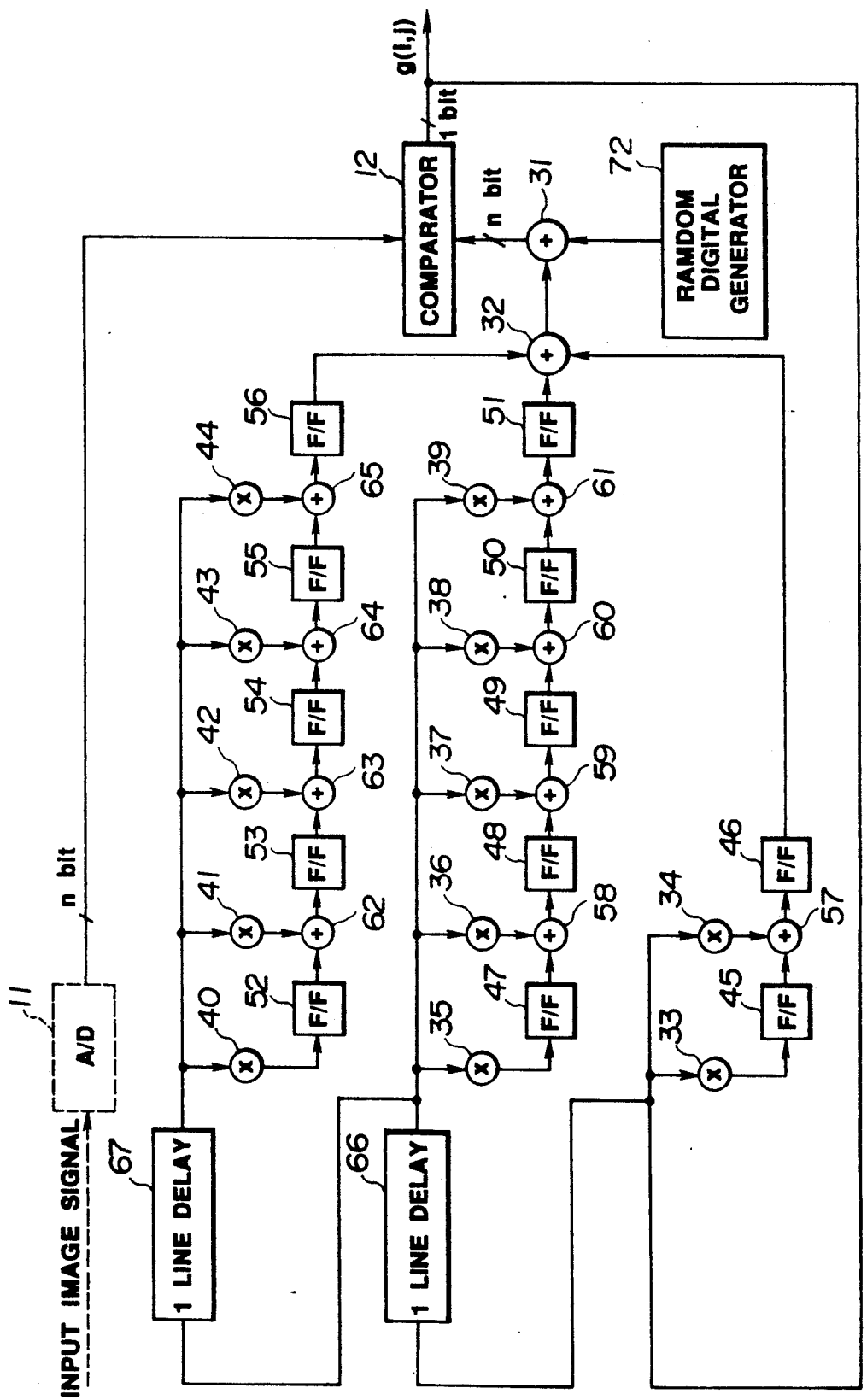
FIG. 13 is a block diagram of another embodiment of the invention wherein the arrangement of FIG. 10 is employed in the arrangement of FIG. 6.

Referring further to FIG. 13, there is shown other embodiment of the present invention, in which the register 70 for storing therein a part, i.e., $\tfrac{1}{2}\alpha$ (0,0) in the right side of the equation (6) in FIG. 10 is replaced by a random digital generator 72. In the present embodiment, such a picture-deterioration preventing method as shown in FIG. 1 is employed. The present embodiment is arranged so that a random digital value generated from the random digital generator 72 is added to the binary threshold value to slightly change the binary threshold value, thereby preventing the deterioration in the picture quality at a constant-density part of the picture. Also in this case, the random digital value generated from the random digital generator 72 should be preferably a correction value when the factor $\tfrac{1}{2}\alpha$ (0,0) is taken into account. Other arrangement is substantially the same as that of FIG. 10.

As has been disclosed in the foregoing, in accordance with the embodiments of FIGS. 10 to 13, the computation of the average density usually carried out in the ROM part is effected with use of the hardware arrangement of the simple adders and flip-flops. As a result, there can be provided such a picture digitizing system that can be made readily in the form of a gate array and can realize its high speed processing.

What is claimed is:

1. A picture digitizing system comprising:
   input means for inputting a picture signal obtained through raster scanning operation of a picture;
   data creation means for creating binary threshold data for a current input picture signal by subjecting said current input picture signal and a previously-input picture signal to a predetermined weighting operation on the basis of past binary data already digitized;

comparison means for comparing said binary threshold data with said current input picture signal to create binary data for the current input picture signal;

feed-back means for outputting said binary data created in said comparison means and also for temporarily storing therein and feeding the binary data back as past binary data; and random changing means for randomly changing the binary threshold data created in said data creation means within a predetermined range.

2. A picture digitizing system as set forth in claim 1, wherein said data creation means includes memory means for storing therein said binary threshold data for said current input picture signal on the basis of said past binary data digitized for said current input picture signal and said previously-input picture signal as address data, inputting said past binary data fed back by said feed-back means and outputting said binary threshold data for said current input picture signal.

3. A picture digitizing system as set forth in claim 1, wherein said data creation means includes computation means for computing said binary threshold data on the basis of said past binary data fed back by said feed-back means.

4. A picture digitizing system as set forth in claim 1, wherein said data creation means further includes measurement means for measuring the numbers of black pixels computed for identical weight factors in said weighting operation and memory means for storing therein said binary threshold data for said current input picture data on the basis of measurement values measured in said measurement means used as address data.

5. A picture digitizing system as set forth in claim 1, wherein said random changing means includes random-digital-data generating means for generating random digital data and means for changing said binary threshold data created in said data creation means in association with said random digital data generated from said random-digital-data generating means.

6. A picture digitizing system as set forth in claim 1, wherein said data creation means includes a plurality of weight means for weighting said binary data fed back by said feed-back means for every pixel on a scanning line basis, a plurality of addition means for adding outputs of said plurality of weight means to outputs of their previous-stage weight means, and a plurality of signal holding means for holding outputs of said plurality of addition means.

7. A picture digitizing system as set forth in claim 1, further comprising means for changing said binary threshold data according to a desired target density.

8. A picture digitizing system comprising:
input means for inputting a picture signal obtained through raster scanning operation of a picture;
random-digital-data generating means for generating random digital data;
memory means for storing therein binary threshold data on the basis of past binary data and said random digital data generated from said random-digital-data generating means used as an address signal; and
comparison means for comparing a current picture signal with said binary threshold data read out from said memory means to create binary data for said current input picture signal.

9. A picture digitizing system comprising:

input means for inputting a picture signal obtained through raster scanning operation of a picture;
random-digital-data generating means for generating random digital data; and
memory means for storing therein binary data on the basis of past binary data, said random digital data generated from said random-digital-data generating means and current input picture data associated with current input picture signal used as an address signal, and for reading out therefrom the binary data associated with the current input picture signal in response to an input of the current input picture signal to create binary data for the current input picture signal.

10. A picture digitizing system comprising:
input means for inputting a picture signal obtained through raster scanning operation of a picture;
data creation means for creating binary threshold data for a current input picture signal by subjecting said current input picture signal and a previously-input picture signal to a predetermined weighting operation on the basis of past binary data already digitized;
density changing means for changing said binary threshold data created in said data creation means according to a desired target density;
comparison means for comparing the binary threshold data changed by said density changing means with said current input picture signal to create binary data for the current input picture signal; and
feed-back means for outputting the binary data created in said comparison means and also for temporarily storing therein and feeding the binary data to said data creation means as past binary data.

11. A picture digitizing system as set forth in claim 10, wherein said data creation means includes memory means for storing therein said binary threshold data for said current input picture signal on the basis of said past binary data digitized for said current input picture signal and said previously-input picture signal as address data, inputting said past binary data fed back by said feed-back means and outputting said binary threshold data for said current input picture signal.

12. A picture digitizing system as set forth in claim 10, wherein said data creation means includes computation means for computing said binary threshold data on the basis of said past binary data fed back by said feed-back means received as an address signal.

13. A picture digitizing system as set forth in claim 10, wherein said data creation means further includes measurement means for measuring the numbers of black pixels computed for identical weight factors in said weighting operation and memory means for storing therein said binary threshold data for said current input picture data on the basis of measurement values measured in said measurement means used as address data.

14. A picture digitizing system as set forth in claim 10, wherein said density changing means includes density-conversion-data generating means for generating density conversion data according to a desired target density to change said binary threshold data created in said data creation means in association with said density conversion data generated from said density-conversion-data generating means.

15. A picture digitizing system as set forth in claim 10, wherein said data creation means includes a plurality of weight means for weighting said binary data fed back by said feed-back means for every pixel on a scanning line basis, a plurality of addition means for adding outputs of said plurality of weight means to outputs of their previous-stage weight means, and a plurality of signal holding means for holding outputs of said plurality of addition means.

16. A picture digitizing system comprising:
input means for inputting a picture signal obtained through raster scanning operation of a picture;
density-conversion-data generating means for generating density conversion data according to a desired target density;
memory means for storing therein binary threshold data on the basis of past binary data and said density conversion data generated from said density-conversion-data generating means used as an address signal; and
comparison means for comparing a current input picture signal with said binary threshold data read out from said memory means to create binary data for said current input picture signal.

17. A picture digitizing system comprising:
input means for inputting a picture signal obtained through raster scanning operation of a picture;
density-conversion-data generating means for generating density conversion data according to a desired target density; and
memory means for storing therein binary data on the basis of past binary data, said density conversion data generated from said density-conversion-data generating means and current input picture data associated with current input picture signal used as an address signal, and for reading out therefrom the binary data associated with the current input picture signal in response to an input of the current input picture signal to create binary data for the current input picture signal.

18. A picture digitizing system comprising:
input means for inputting a picture signal obtained through raster scanning operation of a picture;
a plurality of measurement means for measuring the numbers of black pixels of identically weighted past binary data;
memory means for storing therein binary threshold data for a current input picture signal on the basis of measurement values measured in said plurality of measurement means used as address data; and
comparison means for comparing said input picture signal with said binary threshold data read out from said memory means to create binary data for the current input picture signal.

19. A picture digitizing system comprising:
input means for inputting a picture signal obtained through raster scanning operation of a picture;
measurement means for measuring the numbers of black pixels of identically weighted past binary data; and
memory means for storing therein binary data on the basis of a measurement value of said measurement means and current input picture data associated with a current input picture signal used as an address signal, and for reading out therefrom the binary data associated with the current input picture signal in response to an input of the current input picture signal to create binary data for the current input picture signal.

20. A picture digitizing system comprising:
input means for inputting a picture signal obtained through raster scanning operation of a picture;
data creation means including a plurality of weight means for weighting past binary data for every pixel on a scanning line basis, a plurality of addition means for adding outputs of said plurality of weight means to outputs of their previous-stage weight means, and a plurality of signal holding means for holding outputs of said plurality of addition means, for creating binary threshold data for a current input picture signal; and
comparison means for comparing said current input picture signal with said binary threshold data created by said data creation means to create binary data for the current input picture signal.

* * * * *